(12) United States Patent
Barker Née Leszczyszyn et al.

(10) Patent No.: US 11,067,491 B2
(45) Date of Patent: Jul. 20, 2021

(54) METHOD AND APPARATUS FOR DETERMINING DIFFUSION PROPERTIES OF A SAMPLE

(71) Applicant: Malvern Panalytical Limited, Malvern (GB)

(72) Inventors: Oksana Barker Née Leszczyszyn, Malvern (GB); Seyi Latunde-Dada, Malvern (GB); Rachel Bott, Malvern (GB); Karl Hampton, Malvern (GB)

(73) Assignee: Malvern Panalytical Limited, Malvern (GB)

( * ) Notice: Subject to any disclaimer, the term of this patent is extended or adjusted under 35 U.S.C. 154(b) by 53 days.

(21) Appl. No.: 15/740,650

(22) PCT Filed: Jul. 5, 2016

(86) PCT No.: PCT/GB2016/052025
§ 371 (c)(1),
(2) Date: Dec. 28, 2017

(87) PCT Pub. No.: WO2017/006107
PCT Pub. Date: Jan. 12, 2017

(65) Prior Publication Data
US 2018/0188147 A1    Jul. 5, 2018

(30) Foreign Application Priority Data
Jul. 7, 2015 (EP) .................................... 15175747

(51) Int. Cl.
*G01N 13/00* (2006.01)
*G01N 15/06* (2006.01)

(52) U.S. Cl.
CPC ............. *G01N 13/00* (2013.01); *G01N 15/06* (2013.01); *G01N 2013/003* (2013.01)

(58) Field of Classification Search
CPC ...................................................... G01N 13/00
See application file for complete search history.

(56) References Cited

U.S. PATENT DOCUMENTS

| 6,613,580 | B1  |       | 9/2003 | Chow et al. |           |
|-----------|-----|-------|--------|-------------|-----------|
| 7,039,527 | B2  | *     | 5/2006 | Tripathi    | G01N 13/00 |
|           |     |       |        |             | 702/27    |

(Continued)

FOREIGN PATENT DOCUMENTS

| CA | 2430578 A1   | 11/2003 |
| CN | 101793902 A  | 8/2010  |

(Continued)

OTHER PUBLICATIONS

Saluja et al. (2008). "Nature and Consequences of Protein-Protein Interactions in High Protein Concentration Solutions," *International Journal of Pharmaceutics*, 358:1-15.

(Continued)

*Primary Examiner* — Raymond L Nimox
(74) *Attorney, Agent, or Firm* — Morrison & Foerster LLP (57) ABSTRACT

A method of determining a relationship between a mutual diffusion co-efficient $D_m$ and the concentration c of a solute within a solvent. The method comprises: obtaining a Taylorgram comprising a plurality of measurements of solute concentration c; and deriving from the Taylorgram a plurality of mutual diffusion coefficient values $D_m$ corresponding with a plurality of different concentrations c of solute in the solvent.

14 Claims, 5 Drawing Sheets

(56) References Cited

U.S. PATENT DOCUMENTS

| | | | |
|---|---|---|---|
| 2005/0182573 A1* | 8/2005 | Tripathi | G01N 13/00 |
| | | | 702/27 |
| 2011/0161062 A1* | 6/2011 | Paulus | G01N 30/8693 |
| | | | 703/11 |
| 2013/0072404 A1* | 3/2013 | Miller | B01F 3/0807 |
| | | | 506/11 |
| 2013/0186184 A1* | 7/2013 | Goodall | G01N 11/04 |
| | | | 73/54.01 |
| 2013/0215424 A1* | 8/2013 | Hanlon | G01N 15/0211 |
| | | | 356/337 |
| 2013/0273564 A1 | 10/2013 | Quinn | |
| 2014/0141529 A1* | 5/2014 | Karlsson | G01N 21/553 |
| | | | 436/501 |
| 2015/0192507 A1* | 7/2015 | Cottet | G01N 15/0205 |
| | | | 702/29 |
| 2015/0285724 A1* | 10/2015 | Cohen | B01F 5/045 |
| | | | 73/53.01 |

FOREIGN PATENT DOCUMENTS

| | | |
|---|---|---|
| CN | 101 907 549 | 12/2010 |
| FR | 2 992 423 | 12/2013 |
| JP | H6-81117 U | 11/1994 |
| JP | 2006-511239 A | 4/2006 |
| JP | 2014-533581 A | 12/2014 |
| JP | 2015-521743 A | 7/2015 |
| WO | 2004/083443 A1 | 9/2004 |
| WO | 2013/078179 A1 | 5/2013 |
| WO | 2014/001409 A1 | 1/2014 |
| WO | 2014/064438 A1 | 5/2014 |

OTHER PUBLICATIONS

Saluja et al. (Oct. 2010). "Diffusion and Sedimentation Interaction Parameters for Measuring the Second Virial Coefficient and Their Utility as Predictors of Protein Aggregation," *Biophysical Journal*, 99:2657-2665.

Lehermayr et al. (Jul. 2011). "Assessment of Net Charge and Protein-Protein Interactions of Different Monoclonal Antibodies," *Journal of Pharmaceutical Sciences*, 100(7): 2551-2562.

Connolly et al. (Jul. 2012). "Weak Interactions Govern the Viscosity of Concentrated Antibody Solutions: High-Throughput Analysis Using the Diffusion Interaction Parameter," *Biophysical Journal*, 103:69-78.

Cottet, H. et al. "Determination of dendrigraft poly-L-lysine diffusion coefficients by Taylor dispersion analysis", Biomacromolecules, American Chemical Society, vol. 8, No. 10, Oct. 1, 2007, pp. 3235-3243.

International Search Report dated Jan. 9, 2016, directed to International Application No. PCT/GB2016/052025; 4 pages.

Chen et al., (Feb. 2014). "Measurement of Diffusion Coefficients of Paraffin Molecules using Taylor Dispersion Method," Ciesc Journal 65(2): 605-612.

Cottet et al. (Mar. 1, 2010). "Determination of Individual Diffusion Coefficients in Evolving Binary Mixtures by Taylor Dispersion Analysis: Application to the Monitoring of Polymer Reaction," Analytical Chemistry 82(5): 1793-1802.

Ghanavati et al., (Mar. 2014). "Application of Taylor Dispersion Technique to Measure Mutual Diffusion Coefficient in Hexane + Bitumen System," American Institute of Chemical Engineers 60(7): 2670-2682.

Latunde-Dada, (Oct. 4, 2013). "Analytic Computations of Nonideal Corrections to Blast Wave Overpressure Predictions at High Altitudes," Journal of Geophysical Research: Atmospheres 118: 10,830-10,838.

Leaist, (1991). "Boltzmann Transformation of Taylor Dispersion Profiles to Determine Concentration-Dependent Diffusion Coefficients. Aqueous Cetylpyridinium Chloride near the Critical Micelle Concentration," Ber. Bunsenges. Phys. Chem 95(2): 113-117.

Notification of the First Office Action dated Oct. 24, 2019, directed to CN Application No. 2016800400980; 20 pages.

Sarafianos, (1986). "An Analytical Method of Calculating Variable Diffusion Coefficients," Journal of Materials Science 21: 2283-2288.

Zuo et al., (2007). "Fast Determination of Protein Diffusion Coefficient by Taylor Dispersion Analysis and Capillary Electrophoresis System," Chemical Journal of Chinese Universities 28(10): 1875-1877.

Castillo et al. (1990). "Determination of Mutual Coefficients in Water-Rich 2-Butoxyethanol/Water Mixtures Using the Taylor Dispersion Technique," Journal of Physical Chemistry 94: 8731-8734.

Notice of Reasons for Refusal dated Apr. 7, 2020 directed to JP Application No. 2018-500625; 8 pages.

Search Report dated Mar. 13, 2020, directed to JP Application No. 2018-500625; 16 pages.

Umezawa et al. (1992), "Measurement of the Diffusion Coefficient of Supercritical Alkane-CO2 Systems by the Taylor Dispersion Method," Collection of the Japan Society of Mechanical Engineers vol. B 58 (550): 21 pages.

* cited by examiner

METHOD AND APPARATUS FOR DETERMINING DIFFUSION PROPERTIES OF A SAMPLE

CROSS-REFERENCE TO RELATED APPLICATIONS

This application is a national phase filing under 35 USC § 371 of International Application No. PCT/GB2016/052025, filed on Jul. 5, 2016, and which claims priority to European Application No. 15175747.3, filed on Jul. 7, 2015, the contents of which prior applications are incorporated herein by reference.

FIELD OF THE INVENTION

The invention relates to a method of determining diffusion properties of a sample, and more particularly doing so from a Taylorgram.

BACKGROUND OF THE INVENTION

Developing a biopharmaceutical product that is stable against protein aggregation is a major challenge for the biopharmaceutical industry. Consequently, a significant body of research has been undertaken to understand the mechanisms governing protein self-association or aggregation and how to prevent or mitigate their occurrence. Weak or non-specific protein-protein interactions (PPIs), whose effects become more significant in concentrated protein solutions, have been identified as one pathway for the formation of non-reversible aggregates (Lehermayr et al, 2011, *Assessment of net charge and protein protein interactions of different monoclonal antibodies, Journal of Pharmaceutical Sciences*, 100(7): 2551-2562; Connolly et al, 2012, *Weak interactions govern the viscosity of concentrated antibody solutions: high-throughput analysis using the diffusion interaction parameter, Biophysical Journal*, 103:69-78).

The relationship between interactive forces in dilute protein solutions and the propensity for protein aggregation in a final formulation is not straightforward and is a product of a complicated interplay between solute and solvent properties e.g. concentration, ionic strength and pH (Saluja et al, 2008, *Nature and consequences of protein protein interactions in high protein concentration solutions, International Journal of Pharmaceutics*, 358:1-15). This relationship is further complicated by the presence of excipients and means that empirical determination of the protein-protein interactions is necessary for each formulation under development; and this can amount to hundreds of different combinations.

The diffusion interaction parameter ($k_D$) is one metric that describes the interactive forces between solute molecules in a given medium and a growing body of evidence has shown that it can successfully predict the aggregation propensity of formulations (Saluja et al, 2010, *Diffusion and sedimentation interaction parameters for measuring the second virial coefficient and their utility as predictors of protein aggregation, Biophysical Journal*, 99:2657-2665). The most widely used technique for determining $k_D$ is Dynamic Light Scattering (DLS) because it allows the relatively trivial measurement of the mutual diffusion coefficient ($D_m$); a critical parameter in $k_D$ elucidation. To determine $k_D$, one measures the mutual diffusion coefficient at a series of solute concentrations and a plot of this value as a function of concentration yields $k_D$ from the slope (Equation 1). The self-diffusion coefficient ($D_0$), which describes the diffusion of molecules at infinite dilution and is a measure of the Brownian motion of a single molecule, can also be extracted from the y-intercept.

$$D_m = D_0(1+k_D C) \quad \text{(Eq. 1)}$$

More positive $k_D$ values indicate that repulsive forces between protein molecules dominate within the solution; whereas increasingly negative values suggest that interactions have attractive tendencies, and thus indicate destabilising conditions.

Although the act of data collection is simple and the technique readily amenable to high-throughput screening via a plate reader, $k_D$ determination by DLS may be made more difficult by methodological problems. The first such difficulty relates to the biased scattering intensities exhibited by differently sized particles; whereby the scattering intensity is approximately proportional to the sixth power of the molecular radius ($r^6$). Since it is the average diffusion coefficients that are reported, the resulting values may be susceptible to skew by larger particles. At worst, results can be rendered unusable in the presence of high-order aggregates or dust. In practice, this means that samples must be relatively pure and stable over the duration of the measurement. This may require clean-up procedures, such as filtering, which may be neither desirable nor appropriate for some types of sample. The second issue concerns the potential impact of solute concentration on bulk viscosity of the sample which in turn may affect the diffusion of a molecule in that environment. An increase in viscosity works to restrict diffusion and thus particles would appear to be larger than they truly are. For DLS, this means that the viscosity at all concentrations must be known in order to determine a corrected diffusion coefficient for datapoints where restricted diffusion occurs or the researcher is limited to working in conditions which are no longer representative or relevant.

Nuclear magnetic resonance (NMR) is a second technique that can be used to determine the $k_D$; however, such determinations are non-trivial. The use of specialised solvents or sample constructs may introduce complexities into sample preparation and the conditions of measurement may be different from those in final formulations. In NMR measurements, molecular diffusion must also happen within a specific relaxation regime and, in particular, this makes obtaining accurate diffusion coefficients for larger molecules is more challenging. Consideration must also be given to possible misinterpretation due to presence of contamination, and to overly complicated spectra that may require dedicated personnel to make meaningful analyses. In addition, using NMR to determine diffusion coefficients is extremely time-consuming, as well as financially costly, and thus not applicable to large scale screening.

Sedimentation velocity ultracentrifugation (SV-AUC) and self-interaction chromatography (SIC) cannot directly measure $k_D$ but can measure analogous parameters such as the sedimentation interaction parameter ($k_S$) and second virial coefficient ($A_2$), respectively.

Taylor dispersion analysis can be used to infer a mutual diffusion coefficient. For example, the width of a Gaussian distribution found from a best fit to a pulse Taylorgram can be used to determine a mutual diffusion coefficient for the injected sample. The concentration corresponding with such a single value of mutual diffusion coefficient is generally assumed to be the concentration of the sample at injection, without taking account of any reduction in concentration due to dispersion. A sequence of such measurements at different sample injection concentrations would be required to determine a relationship between concentration and mutual diffusion coefficient.

SUMMARY OF THE INVENTION

The above-mentioned techniques require the preparation and measurement of multiple samples at precisely known concentrations (as well as viscosities). Working with a single intact and unmodified sample would be more favourable when trying to correlate parameters with properties.

A method for investigating diffusion properties of a sample, for example the variation in mutual diffusion coefficient with solute concentration, and the diffusion interaction parameter, that overcomes or ameliorates at least some of these problems is desirable.

According to a first aspect of the invention, there is provided a method of determining a relationship between a mutual diffusion co-efficient $D_m$ and the concentration c of a solute within a solvent. The method comprises obtaining a Taylorgram comprising a plurality of measurements of solute concentration c; and deriving from the Taylorgram a plurality of mutual diffusion coefficient values $D_m$ corresponding with a plurality of different concentrations c of solute in the solvent.

Deriving a plurality of mutual diffusion coefficients corresponding with a plurality of different solute concentrations from a (single) Taylorgram avoids the need for preparing a plurality of samples at different concentrations and obtaining a Taylorgram for each of the plurality of samples. The preparation and separate analysis (whether by DLS or TDA) of a plurality of samples at different (initial) concentrations represents the prior art approach for determining the relationship between the mutual diffusion coefficient $D_m$ and concentration c. Since embodiments of the present disclosure enable determining the relationship between mutual diffusion coefficient $D_m$ and concentration c from a single Taylorgram (and therefore a single sample), the present disclosure represents a significant advance over the prior art.

The method may further comprise fitting a function to the Taylorgram.

The function may be of the form:

$$c = 0.5 c_0 \mathrm{erfc}(u) \text{ where } u = 0.5 \frac{y(t \pm t_M)}{\sqrt{t}},$$

wherein t is the measurement time; c is the concentration; and $t_M$, y and $c_0$ are parameters to be determined from the fit.

The method may further comprise differentiating the Taylorgram to determine a rate of change of concentration with respect to time $$\frac{dc}{dt}.$$

The mutual diffusion coefficient values $D_m$ may be derived from the function that is fitted to the Taylorgram and from the rate of change of concentration with respect to time.

The mutual diffusion coefficient values $D_m$ may be determined using the following expression:

$$D_m(c) = \frac{\left[-4 \frac{dc\sqrt{\pi} \, t \frac{3}{2} e^{u^2}}{dt(t+t_M)\sqrt{t_M}}\right]^2 r^2 t_M}{48}$$

where r is the radius of the capillary.

The method may further comprise performing a transform on the Taylorgram to find a relationship between $\xi$ and concentration c, where $$\xi = \frac{x}{2\sqrt{t}}.$$

The method may further comprise determining an interface $\xi_M$ from the equation $$\xi_M = \frac{1}{c_L - c_R} \int_{c_R}^{c_L} \xi \, dc,$$

where $c_L$ is the higher limit of concentration c, and $c_R$ is the lower limit of concentration c, or where $c_L$ is the lower limit of concentration c, and $c_R$ is the higher limit of concentration.

The method may further comprise:
determining a value of u corresponding with each concentration value c, from the relationship $c = 0.5 c_0 \mathrm{erfc}(u)$;
determining parameters h and m by fitting a straight line to the relationship between u and $\xi$, using the relationship $u = h(\xi - \xi_M) + m$;
wherein deriving the plurality of mutual diffusion coefficient values $D_m$ corresponding with a plurality of different concentrations c of solute in the solvent comprises using the relationship $$\frac{1}{h^2} + \frac{m\sqrt{\pi}}{h^2} \mathrm{erfc}(u)\exp(u^2) = \frac{r^2 v^2}{48 D_m(c)}.$$

Deriving the plurality of mutual diffusion coefficient values $D_m$ may be performed by numerically determining a plurality of values of the differential $$\frac{d\xi}{dc}$$

and a plurality of values of the integral $\int_0^c \xi - \xi_M \, dc$, corresponding with different concentrations c, and using the expression $$-\frac{1}{2} \frac{d\xi}{dc} \int_0^c \xi - \xi_M \, dc = \frac{r^2 v^2}{48 D_m(c)}.$$

The method may further comprise determining a diffusion interaction parameter $k_D$ of the solute in the solvent from the relationship $D_m(c)$ between the mutual diffusion coefficient values $D_m$ and the corresponding concentrations c.

The method may further comprise determining the second virial coefficient $A_2$ from the diffusion interaction parameter $k_D$ and an estimate of the coefficient of friction $k_f$ and an estimate of the partial specific volume $v_2$ of the solute.

The method may further comprise estimating a measure of aggregation of solute particles from the values of the mutual diffusion coefficient over the duration of the Taylorgram.

According to a second aspect, an apparatus is provided, comprising a processor, configured to perform the method of the first aspect.

The apparatus may further comprise an instrument for performing a Taylor dispersion analysis, so as to obtain a Taylorgram.

According to a third aspect, there is provided a machine readable medium, comprising instructions for configuring a processor to perform the method according to the first aspect.

BRIEF DESCRIPTION OF THE DRAWINGS

Examples will now be described, with reference to the accompanying drawings, in which.

DETAILED DESCRIPTION OF THE INVENTION

Taylor dispersion is a process by which shear flow is used to enhance the effective diffusivity of a sample Laminar flow in a capillary results in a variation in flow velocity with radial location. Near the walls, the flow is substantially stationary, and flow velocity is at a maximum at the centre. This results in shearing of the adjacent lamina, which acts to enhance dispersion of a sample.

Taylor dispersion analysis (TDA) can be used to analyse properties of species within a sample. A plug of the sample may be injected into a microbore capillary and subsequently disperse as it traverses along the capillary within a laminar flow regime. The injected plug of the sample may be narrow (having a short duration) this being referred to as a pulse of the sample, resulting in a pulse Taylorgram. Alternatively the injected plug of the sample may be long (i.e. having a longer duration) this may be referred to as a slug of the sample, resulting in a frontal Taylorgram. The degree of dispersion exhibited by the plug is dependent on the diffusivity of the molecules within the plug and can be measured at one or multiple points downstream of the injection site. A concentration detector, responsive to the species of the sample, may be positioned at one or more locations downstream of the injection location. The concentration detectors (e.g. a UV-Visible spectrometer) may thereby produce a signal that is proportional to the concentration of the molecules in each cross-section of the flow past the detector. The resultant signal from the detector, typically referred to as a Taylorgram, corresponds to a temporally-resolved distribution of molecular concentration whose width is related to the hydrodynamic radius of the sample species.

Figure 1:
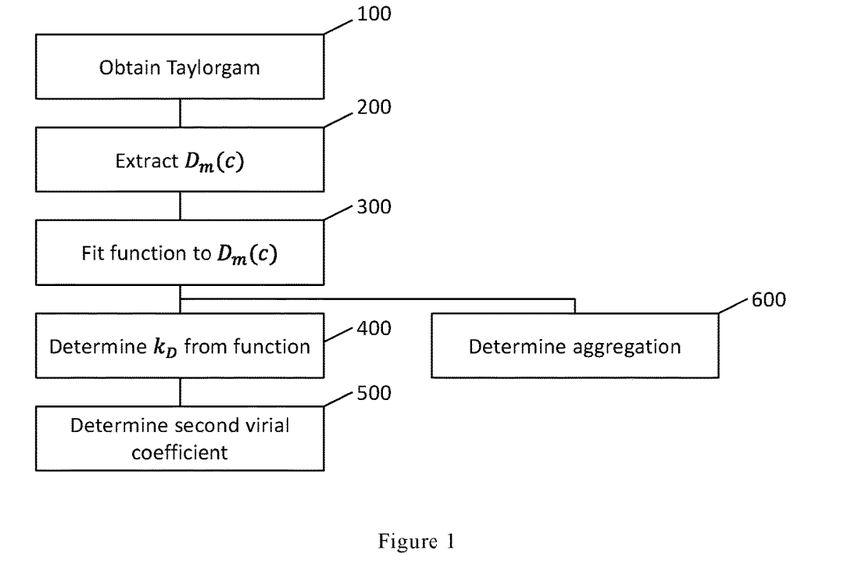
FIG. 1 is a schematic of a method for investigating diffusion properties.

Referring to FIG. 1, a method according to an example embodiment comprises obtaining a Taylorgram at step 100, and then extracting (or determining) from the Taylorgram a relationship $D_m(c)$ between the mutual diffusion coefficient $D_m$ and the concentration c, at step 200, for example by calculating a plurality of values of mutual diffusion coefficient at a corresponding plurality of different concentration values. Significantly, the methods disclosed more fully hereinafter can determine the relationship between mutual diffusion coefficient and concentration from a single Taylorgram.

The Taylorgram obtained at 100 may be generated from a plug or pulse injection, and may comprise a single detection point or multiple detection points.

Once $D_m(c)$ has been obtained, in step 300 a function may be fitted to $D_m(c)$, for example by plotting $D_m(c)$ and fitting a straight line to the relationship. In step 400, the parameters of the function may then be extracted and used to determine the diffusion interaction parameter, $k_D$.

In optional step 600, the relationship $D_m(c)$ between the mutual diffusion coefficient and concentration may be used to determine an aggregation % over the course of the Taylorgram. For example, aggregation will result in a change in the mutual diffusion coefficient, so a discontinuity in the mutual diffusion coefficient $D_m(c)$ may indicate aggregation of particles.

In optional step 500, the diffusion interaction parameter $k_D$ may in turn be used to determine the second virial coefficient $A_2$, for instance using estimates of the molecular weight, coefficient of friction and the partial specific volume of the solute.

Figure 2:
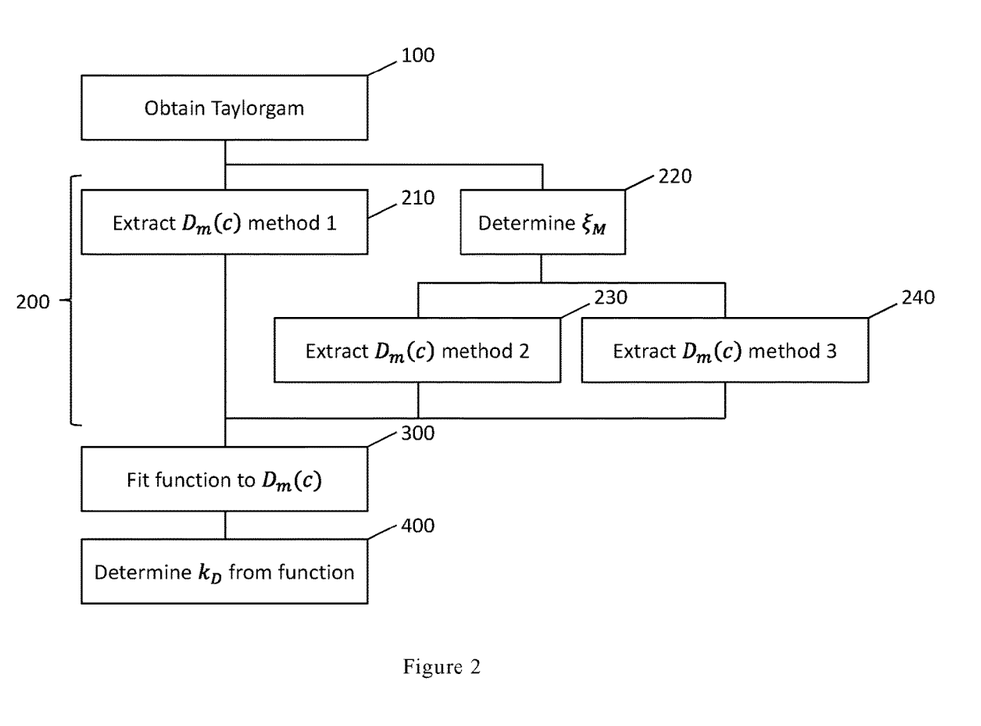
FIG. 2 is a schematic showing the outline of three alternatives for extracting a relationship between mutual diffusion coefficient and concentration.

Referring to FIG. 2, three different example methods are schematically illustrated for determining the relationship $D_m(c)$ between the mutual diffusion coefficient $D_m$ and concentration, c. Step 200, in which $D_m(c)$ is extracted, is expanded into three different methods. The first of these methods 210, is different from the second method 230 and third method 240. Both of the second and third method 230, 240, involve determining an interface $\xi_M$, at step 220.

Each of the methods will now be described in more detail. The present invention is suitable for determining the diffusion in interaction parameter $k_D$ from a Taylorgram generated from a single measurement. The sample may be injected in a slug, so as to create a frontal Taylorgram, or in a pulse, to create a pulse Taylorgram. The mathematics in the example methods deal with a frontal Taylorgram, but the skilled person will appreciate that it is straightforward to adapt the method for a pulse Taylorgram. The method uses the inherent variation in concentration over the course of a Taylorgram to provide a concentration series in which the state of interaction between the molecules is determined with reference to the concentration dependence of the mutual diffusion coefficient $D_m$.

Although UV absorption is typically used to determine concentration in a Taylorgram, the method will also work with any detection method that produces signals in which the concentration and signal from a particle can be rationally correlated, for example, based on any of: refractive index, fluorescence via an extinction coefficient. Each point in a Taylorgram represents a concentration, so a single Taylorgram provides a plurality of solute concentrations.

Method 1—Explicit Differential Method

Figure 3:
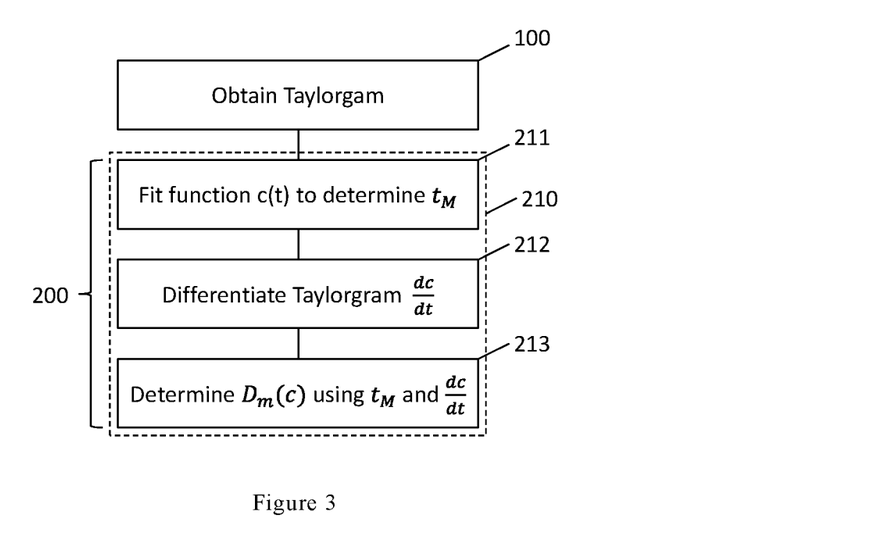
FIG. 3 is a schematic showing the first of three alternative methods for extracting a relationship between mutual diffusion coefficient and concentration.

This method 210 is illustrated schematically in FIG. 3. First, in step 211 a function is fitted to the Taylorgram. The function may be of the form:

$$c = 0.5 c_0 \operatorname{erfc}(u) \quad \text{(Eq. 2)}$$

where $$u = 0.5 \frac{y(t \pm t_M)}{\sqrt{t}} \quad \text{(Eq. 3)}$$

In which t is the measurement time, and $t_M$ is a parameter to be determined from the fit. Plus or minus signs in the $t \pm t_M$ term are used to designate analyses for the leading and trailing edges of a frontal Taylorgram, respectively. Note, that although y is estimated, it may be redundant in this method.

Next, in step 212, the Taylorgram (or the function fitted to the Taylorgram) is differentiated, for instance using Savitzy-Golay differentiation (or the difference method), to obtain $$\frac{dc}{dt}.$$

Next, from, $$\frac{dc}{dt}$$

determine h' from equation 4, below:

$$h'(C) = -4 \frac{dc}{dt} \frac{\sqrt{\pi}\, t^{\frac{3}{2}} e^{u^2}}{(t + t_M) \sqrt{t_M}} \quad \text{(Eq. 4)}$$

A value of h' can be determined for each datapoint in the Taylorgram. Note that the determination of h' is not an essential step, but merely provides for a more elegant description of the calculation. In some embodiments the expression for h' may be substituted into Eq. 5 below, and $D_m(c)$.

Finally, determine the mutual diffusion coefficient $D_m(c)$ using the following expression:

$$D_m(c) = \frac{h'(c)^2 r^2 t_M}{48} \quad \text{(Eq. 5)}$$

Common Features of Methods 2 and 3

Figure 4:
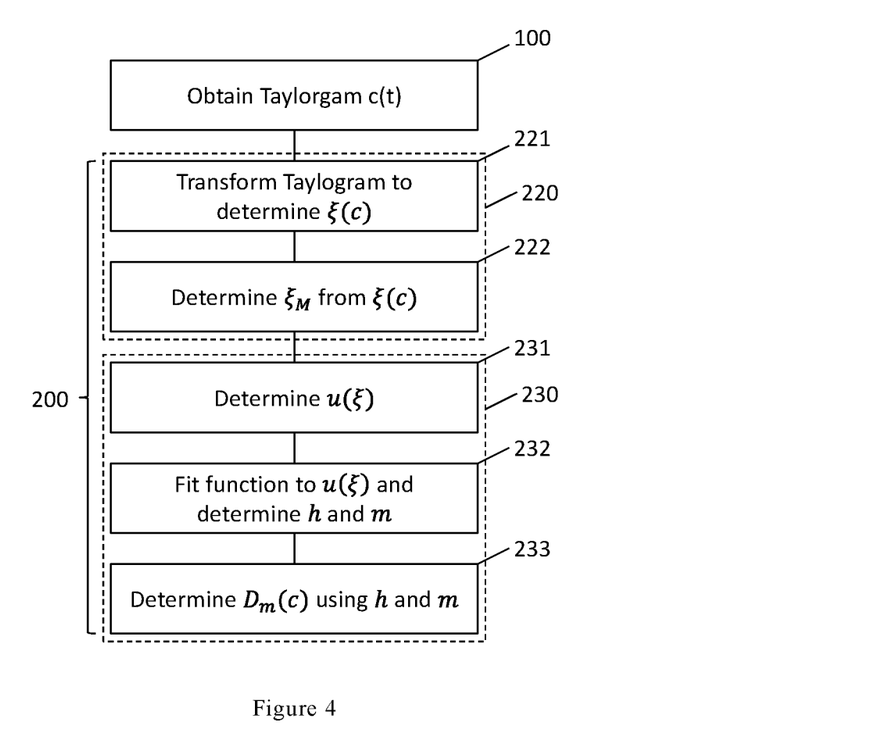
FIG. 4 is a schematic showing the second of three alternative methods for extracting a relationship between mutual diffusion coefficient and concentration.
Figure 5:
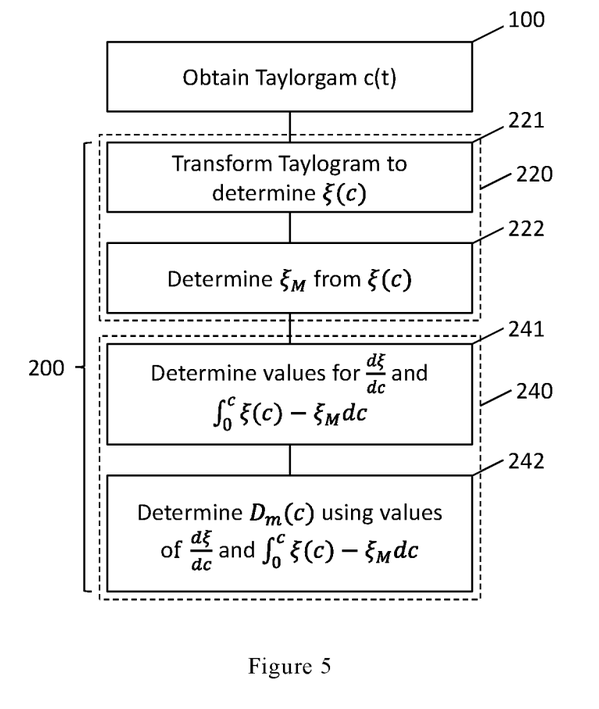
FIG. 5 is a schematic showing the third of three alternative methods for extracting a relationship between mutual diffusion coefficient and concentration.

Both the second and third example methods share the steps 220 for determining a reference value, $\xi_M$, as shown in FIGS. 2, 4 and 5.

The Taylor dispersion relation for a sample plug in a buffer flowing at a mean speed of v in a capillary of radius r is given by $$\frac{\partial c}{\partial t} = \frac{\partial}{\partial x}\left[k(c)\frac{\partial c}{\partial x}\right] \quad \text{(Eq. 6)}$$

where c is the concentration, x is the distance dispersed relative to the initial edge of the plug, k is the dispersion coefficient which is given by $$\frac{r^2 v^2}{48 D_m(c)}.$$

Using the Boltzmann transformation $$\xi = \frac{x}{2\sqrt{t}} \quad \text{(Eq. 7)}$$

equation 6 can be rearranged to give:

$$-2\xi \frac{dc}{d\xi} = \frac{d}{d\xi}\left[k(c)\frac{dc}{d\xi}\right] \quad \text{(Eq. 8)}$$

This can be solved to give:

$$k(c) = -\frac{1}{2}\frac{d\xi}{dc}\int_0^c \xi - \xi_m dc = \frac{r^2 v^2}{48 D_m(c)} \quad \text{(Eq. 9)}$$

In which $\xi_m$ defines a reference point, which must be properly determined for the mutual diffusion coefficients to be physically representative. The reference point is constrained by the requirement:

$$\int_{c_R}^{c_L}(\xi - \xi_M)dc = 0 \quad \text{(Eq. 10)}$$

where $c_L$ and $c_R$ are the limits of the concentrations to the left and right of the Taylorgram (i.e. corresponding with a maximum and minimum value of the concentration, depending on whether the method is performed on a leading edge or trailing edge of a frontal Taylorgram). The reference point $\xi_M$ may define an interface, and is not in general and may not be co-incident with $\xi = 0$.

However for constant volume dispersion (as is the case in Taylor dispersion), the interface may be coincident with $\xi = 0$ (i.e. corresponding with an initial edge of the plug). Typically, this edge is ill-defined after considerable dispersion, but can be determined from the following relation:

$$\xi_M = \frac{1}{c_L - c_R}\int_{c_R}^{c_L}\xi\, dc \quad \text{(Eq. 11)}$$

Hence, given a concentration profile of c as a function of $\xi$ as well as the reference point $\xi_M$, the values of k as a function of c can be determined. This can be achieved via either of the second or third methods.

Method 2

Figure 6:
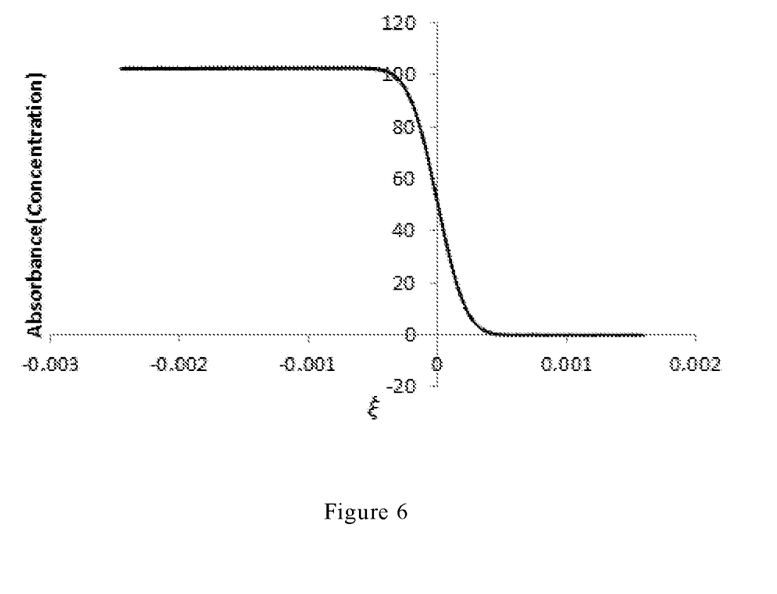
FIG. 6 is a graph showing a concentration plotted against $\xi$.

This method considers the concentration profile c as a function of ξ, as shown in FIG. 6.

The function:

$$C = 0.5 C_0 \, \text{erfc}(u) \quad (\text{Eq. 12})$$

is evaluated to obtain a value of u for each value c of the Taylorgram. The Boltzmann transformation (defined by equation 7) is used to determine a relationship between ξ and concentration c. Via the concentration c a relationship can subsequently be determined between u and ξ. A function can be fitted to describe this relationship, in accordance with the following (for instance by plotting u against ξ, and fitting a straight line):

$$u = h(\xi - \xi_M) + m \quad (\text{Eq. 13})$$

Where h and m are parameters determined by the fit. Inserting equation 13 into equation 12, and then solving for k(c) in equation 9 gives:

$$k(c) = \frac{1}{h^2} + \frac{m\sqrt{\pi}}{h^2} \, \text{erfc}(u) \exp(u^2) = \frac{r^2 v^2}{48 D_m(c)} \quad (\text{Eq. 14})$$

from which it is straightforward to determine $D_m(c)$.

Method 3

This method can be performed numerically or graphically, and involves the estimation of evaluation of the integral $\int_0^c \xi - \xi_m \, dc$ and the differential $$\frac{d\xi}{dc}$$

in equation 9 directly from the transformed concentration profile c(ξ). The skilled person will be aware that a wide range of techniques exist for approximating differentials and integrals from such data, either numerically or graphically from a plot. Smoothing or filtering of the data may be performed before, or after performing the transform, for instance using a moving average, or by a Savitzky-Golay filter.

Second Virial Coefficient

Another, closely related, parameter suitable for measuring protein-protein interactions is the second virial coefficient, $A_2$—also known as the osmotic virial coefficient ($B_{22}$ or $B_2$). The second virial coefficient is linked to $k_D$ by the following expression (Eq. 15); where $M_W$ is the molecular weight of the protein, $k_f$ is the coefficient of friction and $v_2$ is the partial specific volume.

$$k_D = 2 M_W A_2 - k_f - 2 v_2 \quad (\text{Eq. 15})$$

Here, positive and negative $A_2$ values are suggestive of repulsive and attractive forces between protein molecules, respectively.

Providing that the coefficient of friction and partial specific volume are known or can be otherwise estimated or determined, the $A_2$ parameter can also be extracted using $k_D$.

Aggregation

The mutual diffusion coefficient $D_m(c)$ provides a measure of the average size of the species under analysis. As the species transition through the capillary they are spatially distributed within the plug. With this knowledge and with the measurement of the diffusion coefficient at every data point collected over a certain time period a measure of aggregation can be estimated (e.g. a proportion or % aggregation) from the change in diffusion coefficient $D_m(c)$ over the Taylorgram.

Apparatus

Figure 7:
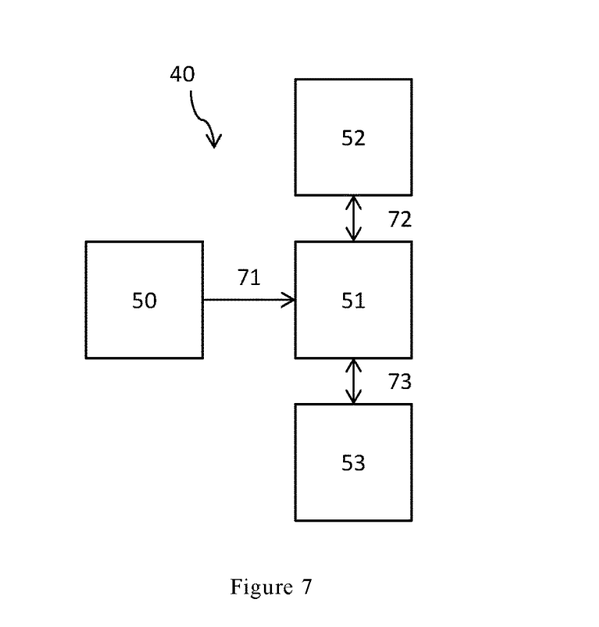
FIG. 7 is schematic of an apparatus according to an embodiment.

Referring to FIG. 7, an apparatus 40 is shown in accordance with an embodiment. The apparatus 40 comprises an instrument 50, processor 51, output means 52 and input means 53. The instrument 50 is operable to perform a Taylor dispersion analysis on a sample, so as to produce Taylorgram data 71. The processor 51 may be configured to estimate parameters for fitting a model (e.g. Gaussian, error function) to the Taylorgram data 71, in accordance with an embodiment (for instance as described above). The processor 51 may provide an output 72 to the output means 52, which may comprise a display or printer. The output 72 may comprise model parameter estimates, and/or estimates of the properties of the sample analysed by the instrument 50, based on a model fitted to the data 71 by the processor 51. The processor 51 may be configured to use estimated model parameters (determined according to an embodiment) as a starting point for a numerical search for a best fit to the Taylorgram data 71 (for instance via regression analysis based on least squares). An input means 53 may be provided for controlling the processor 51 and/or instrument. The input means 53 may comprise a keyboard, mouse or other suitable user interface device.

The instrument 50 may comprise a capillary linking two containers. Liquid is driven (e.g. at constant pressure) from the first container to the second container. The first container contains a run (or carrier) solution so that the capillary is initially filled with the run solution. The first container is then disconnected from the capillary, and a third container is connected that contains a sample solution. The sample solution may be a pharmaceutical or biopharmaceutical species dissolved either in the run/carrier solution, or in a different medium. The different medium may differ from the run/carrier solution in having an excipient, e.g. a salt or a sugar, dissolved at a different concentration than in the run/carrier solution. This may be appropriate in formulations which are designed to stabilise active drug species.

A first and second window are spaced apart along the length of the capillary between the first and second containers. The capillary may be formed in a loop so that both the first and second windows may be imaged using a single optical assembly, for instance by arranging for them to be adjacent to one another in an area imaged by the pixel array of an area imaging detector. In other embodiments, a single window may be used, or the detector may comprise a single element, rather than a pixel array.

To inject a plug of the sample into the capillary the third container may be connected to the capillary and then disconnected after a suitable volume of the sample has been injected under pressure. The first container is connected the capillary when the third container is disconnected from the capillary. The detector captures a frame sequence comprising measures of the received light intensity at the detector as the pulse of sample solution or the flow front passes through each of the first and second windows. The detector output thereby provides data on absorbance versus time: a Taylorgram.

Example Results

The methodology described herein was applied to frontal Taylorgrams obtained from BSA (Bovine Serum Albumin) prepared in Iodide and Sulphate buffers at a final concentration of 30 mg/mL. Samples were injected into a microbore capillary (ID 75 μm) at 140 mbar for a duration of 3 minutes and eluted using the same pressure. Taylorgrams were recorded using UV detection at a wavelength of 280 nm.

Figure 8:
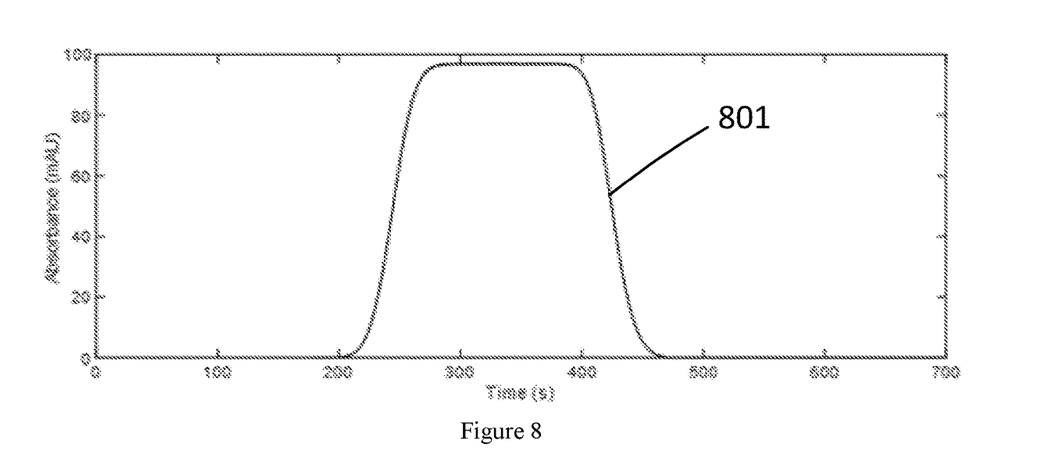
FIG. 8 is a frontal Taylorgram of BSA in iodide solution, which can be used in an embodiment to determine the relationship between mutual diffusion coefficient and concentration.

FIG. 8 shows an example of a frontal Taylorgram 801 obtained from a sample of BSA in an iodide buffer solution from which a self-diffusion co-efficient $D_0$ and diffusion interaction parameter $k_D$ can be obtained, in accordance with an embodiment.

Figure 9:
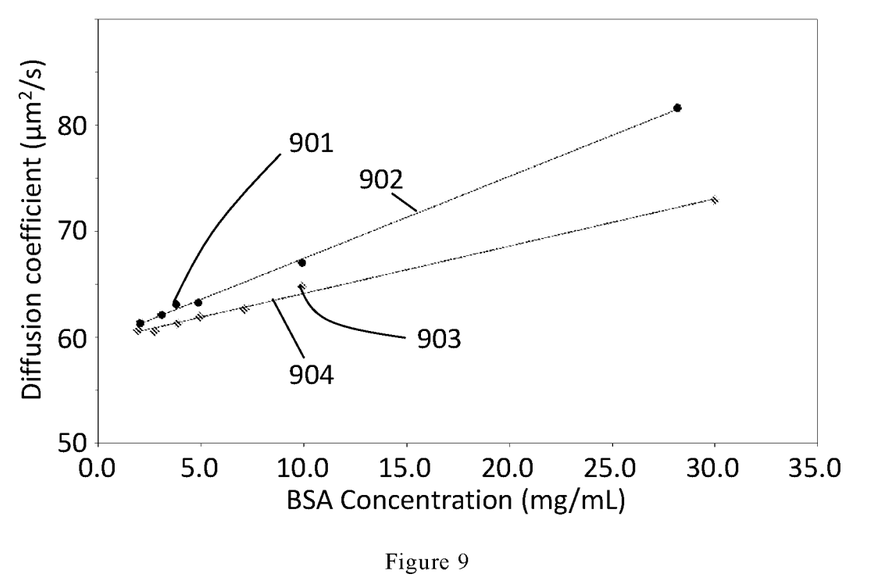
FIG. 9 is a graph showing a series of DLS measurements used to obtain estimates for self-diffusion coefficient $D_0$ and diffusion interaction parameter $k_D$ for comparison with estimates obtained from a Taylorgram, according to an embodiment.

FIG. 9 shows diffusion co-efficient values for BSA in an iodide buffer 901 and a sulfate buffer 203, obtained by performing DLS on each of a plurality of sample concentrations, according to conventional prior art methodology for determining Do and $k_D$. A best fit 902, 904 can be used to determine $D_0$ and $k_D$ (from equation 1).

Clearly, both sample preparation and analysis are considerably more laborious according to the prior art method, compared with embodiments of the present disclosure, which uses a single initial sample and a single Taylorgram. These comments also apply to determination of these parameters by prior art TDA methods, which would also require preparation of a similar series of sample concentrations for injection and analysis. Auto-dilution and automatic sample handling may reduce some of the drudgery, but would result in a more complex and expensive instrument, and performing this sort of series of measurements would still take a considerable amount of time and consume significant amounts of sample, which may be prohibitive in the context of early pharmaceutical development (where available quantities of sample may be very small/expensive).

The results are summarised in Table 1 below:

TABLE 1

Summary of results. Determination of the self-diffusion coefficient and interaction parameter using the first, second and third example methods. Comparison with the traditional DLS method is also shown.

| Buffer | Parameter | Method 1 | 2 | 3 | DLS |
|---|---|---|---|---|---|
| Iodide | $D_0$ (μm²/s) | 54.55 | 54.67 | 56.16 | 59.3 |
|  | $k_D$ | 0.016 | 0.016 | 0.012 | 0.016 |
| Sulfate | $D_0$ (μm²/s) | 54.68 | 54.70 | 54.94 | 58.4 |
|  | $k_D$ | 0.009 | 0.009 | 0.009 | 0.009 |

All methods are in good agreement with the results from DLS and with trends expected from the reverse Hofmeister effect.

A number of other variations are possible, within the scope of the invention, as defined by the appended claims.

The invention claimed is:

1. A method of determining a diffusion interaction parameter of a solute in a solvent from a relationship between a mutual diffusion co-efficient $D_m$ and a concentration c of the solute within the solvent, comprising:
    obtaining a Taylorgram comprising a plurality of measurements of solute concentration c by performing a Taylor dispersion analysis, wherein performing the Taylor dispersion analysis comprises:
        flowing a carrier solution through a capillary comprising a window;
        injecting a sample liquid into the capillary to form a sample plug or sample front;
        determining a Taylorgram by measuring absorbance over time at the window as the sample plug or sample front flows past the window;
    deriving from the Taylorgram a plurality of mutual diffusion coefficient values $D_m$ corresponding with a plurality of different concentrations c of solute in the solvent; and
    fitting a function to the Taylorgram, wherein the function is of the form:

$$c = 0.5 c_0 \mathrm{erfc}(u) \text{ where } u = 0.5 \frac{y(t \pm t_M)}{\sqrt{t}},$$

wherein t is the measurement time; c is the concentration; and $t_M$, y and $c_0$ are parameters to be determined from the fit;
    determining the diffusion interaction parameter $k_D$ of the solute in the solvent from the relationship $D_m(c)$ between the mutual diffusion coefficient values $D_m$ and the corresponding concentrations c.

2. The method of claim 1, further comprising differentiating the Taylorgram to determine a rate of change of concentration with respect to time $$\frac{dc}{dt}.$$

3. The method of claim 2, wherein the mutual diffusion coefficient values $D_m$ are derived from the function that is fitted to the Taylorgram and from the rate of change of concentration with respect to time.

4. The method of claim 3, wherein the mutual diffusion coefficient values $D_m$ are determined using the following expression:

$$D_m(c) = \frac{\left[-4 \frac{\frac{dc}{dt} \sqrt{\pi t} \frac{3}{2} e^{u^2}}{dt(t+t_M)\sqrt{t_M}}\right]^2 r^2 t_M}{48}$$

where r is the radius of the capillary.

5. A method of determining a diffusion interaction parameter of a solute in a solvent from a relationship between a mutual diffusion co-efficient $D_m$ and a concentration c of the solute within the solvent, comprising:
    obtaining a Taylorgram comprising a plurality of measurements of solute concentration c by performing a Taylor dispersion analysis, wherein performing the Taylor dispersion analysis comprises:
        flowing a carrier solution through a capillary comprising a window;
        injecting a sample liquid into the capillary to form a sample plug or sample front;
        determining a Taylorgram by measuring absorbance over time at the window as the sample plug or sample front flows past the window;
    deriving from the Taylorgram a plurality of mutual diffusion coefficient values $D_m$ corresponding with a plurality of different concentrations c of solute in the solvent;

performing a transform on the Taylorgram to find a relationship between $\xi$ and concentration c, where $$\xi = \frac{x}{2\sqrt{t}};$$

determining an interface $\xi_M$ from the equation $$\xi_M = \frac{1}{c_L - c_R} \int_{c_R}^{c_L} \xi dc,$$

where $c_L$ is the higher limit of concentration c, and $c_R$ is the lower limit of concentration c, or vice-versa;
    determining a value of u corresponding with each concentration value c, from the relationship $c=0.5c_0\mathrm{erfc}(u)$;
    determining parameters h and m by fitting a straight line to the relationship between u and $\xi$, using the relationship $u=h(\xi-\xi_M)+m$;
    wherein deriving the plurality of mutual diffusion coefficient values $D_m$ corresponding with a plurality of different concentrations c of solute in the solvent comprises using the relationship $$\frac{1}{h^2} + \frac{m\sqrt{\pi}}{h^2}\mathrm{erfc}(u)\exp(u^2) = \frac{r^2 v^2}{48 D_m(c)};$$

determining the diffusion interaction parameter $k_D$ of the solute in the solvent from the relationship $D_m(c)$ between the mutual diffusion coefficient values $D_m$ and the corresponding concentrations c.

6. The method of claim 5, wherein deriving the plurality of mutual diffusion coefficient values $D_m$ is performed by numerically determining a plurality of the differential $$\frac{d\xi}{dc}$$

and a plurality of the integral $\int_0^c \xi - \xi_M dc$, corresponding with different concentrations c, and using the expression $$-\frac{1}{2}\frac{d\xi}{dc}\int_{c_R}^{c_L} \xi - \xi_M dc = \frac{r^2 v^2}{48 D_m(c)}.$$

7. A method of determining a diffusion interaction parameter of a solute in a solvent from a relationship between a mutual diffusion co-efficient $D_m$ and a concentration c of the solute within the solvent, comprising:
    obtaining a Taylorgram comprising a plurality of measurements of solute concentration c by performing a Taylor dispersion analysis, wherein performing the Taylor dispersion analysis comprises:
        flowing a carrier solution through a capillary comprising a window;
        injecting a sample liquid into the capillary to form a sample plug or sample front;
        determining a Taylorgram by measuring absorbance over time at the window as the sample plug or sample front flows past the window;
    deriving from the Taylorgram a plurality of mutual diffusion coefficient values $D_m$ corresponding with a plurality of different concentrations c of solute in the solvent;
    determining the diffusion interaction parameter $k_D$ of the solute in the solvent from the relationship $D_m(c)$ between the mutual diffusion coefficient values $D_m$ and the corresponding concentrations c.

8. The method of claim 7, further comprising determining the second virial coefficient $A_2$ from the diffusion interaction parameter $k_D$ and an estimate of the coefficient of friction $k_f$ and an estimate of the partial specific volume $v_2$ of the solute.

9. A method of determining a diffusion interaction parameter of a solute in a solvent from a relationship between a mutual diffusion co-efficient $D_m$ and a concentration c of the solute within the solvent, comprising:
    obtaining a Taylorgram comprising a plurality of measurements of solute concentration c by performing a Taylor dispersion analysis, wherein performing the Taylor dispersion analysis comprises:
        flowing a carrier solution through a capillary comprising a window;
        injecting a sample liquid into the capillary to form a sample plug or sample front;
        determining a Taylorgram by measuring absorbance over time at the window as the sample plug or sample front flows past the window;
    deriving from the Taylorgram a plurality of mutual diffusion coefficient values $D_m$ corresponding with a plurality of different concentrations c of solute in the solvent;
    estimating a measure of aggregation of solute particles from the values of the mutual diffusion coefficient over the duration of the Taylorgram;
    determining the diffusion interaction parameter $k_D$ of the solute in the solvent from the relationship $D_m(c)$ between the mutual diffusion coefficient values $D_m$ and the corresponding concentrations c; and
    determining a stability of the solute in the solution based on the diffusion interaction parameter.

10. An apparatus, comprising an instrument and a processor, wherein:
    the instrument comprises:
        a capillary comprising a window,
        a carrier container for receiving a carrier liquid,
        a sample container for receiving a sample liquid, and
        a detector configured to detect absorbance of a liquid within the capillary at the window; and
    the instrument is configured to obtain a Taylorgram comprising a plurality of measurements of solute concentration c by performing a Taylor dispersion analysis, wherein performing the Taylor dispersion analysis comprises:
        flowing a carrier solution from the carrier container through the capillary;
        injecting a sample liquid from the sample container into the capillary to form a sample plug or sample front;
        determining a Taylorgram by measuring, with the detector, absorbance over time at the window as the sample plug or sample front flows past the window; and
    the processor is configured to:
        derive from the Taylorgram a plurality of mutual diffusion coefficient values $D_m$ corresponding with a plurality of different concentrations c of solute in the solvent; and fit a function to the Taylorgram, wherein the function is of the form:

$$c = 0.5 c_0 \mathrm{erfc}(u) \text{ where } u = 0.5 \frac{y(t \pm t_M)}{\sqrt{t}},$$

wherein t is the measurement time; c is the concentration; and $t_M$, y and $c_0$ are parameters to be determined from the fit;

determine a diffusion interaction parameter $k_D$ of the solute in the solvent from the relationship $D_m(c)$ between the mutual diffusion coefficient values $D_m$ and the corresponding concentrations c.

11. The method of claim 1, further comprising performing a transform on the Taylorgram to find a relationship between $\xi$ and concentration c, where $$\xi = \frac{x}{2\sqrt{t}}.$$

12. An apparatus, comprising an instrument and a processor, wherein:
the instrument comprises:
a capillary comprising a window,
a carrier container for receiving a carrier liquid,
a sample container for receiving a sample liquid, and
a detector configured to detect absorbance of a liquid within the capillary at the window; and
the instrument is configured to obtain a Taylorgram comprising a plurality of measurements of solute concentration c by performing a Taylor dispersion analysis, wherein performing the Taylor dispersion analysis comprises:
flowing a carrier solution from the carrier container through the capillary;
injecting a sample liquid from the sample container into the capillary to form a sample plug or sample front;
determining a Taylorgram by measuring, with the detector, absorbance over time at the window as the sample plug or sample front flows past the window; and
the processor is configured to:
derive from the Taylorgram a plurality of mutual diffusion coefficient values $D_m$ corresponding with a plurality of different concentrations c of solute in the solvent;
perform a transform on the Taylorgram to find a relationship between $\xi$ and concentration c, where $$\xi = \frac{x}{2\sqrt{t}};$$

determine an interface $\xi_M$ from the equation $$\xi_M = \frac{1}{c_L - c_R} \int_{c_R}^{c_L} \xi \, dc,$$

where $c_L$ is the higher limit of concentration c, and $c_R$ is the lower limit of concentration c, or vice-versa;

determine a value of u corresponding with each concentration value c, from the relationship $c = 0.5 c_0 \mathrm{erfc}(u)$;

determine parameters h and m by fitting a straight line to the relationship between u and $\xi$, using the relationship $u = h(\xi - \xi_M) + m$, wherein deriving the plurality of mutual diffusion coefficient values $D_m$ corresponding with a plurality of different concentrations c of solute in the solvent comprises using the relationship $$\frac{1}{h^2} + \frac{m\sqrt{\pi}}{h^2} \mathrm{erfc}(u) \exp(u^2) = \frac{r^2 v^2}{48 D_m(c)};$$

and
determine a diffusion interaction parameter $k_D$ of the solute in the solvent from the relationship $D_m(c)$ between the mutual diffusion coefficient values $D_m$ and the corresponding concentrations c.

13. An apparatus, comprising an instrument an instrument and a processor, wherein:
the instrument comprises:
a capillary comprising a window,
a carrier container for receiving a carrier liquid,
a sample container for receiving a sample liquid, and
a detector configured to detect absorbance of a liquid within the capillary at the window; and
the instrument is configured to obtain a Taylorgram comprising a plurality of measurements of solute concentration c by performing a Taylor dispersion analysis, wherein performing the Taylor dispersion analysis comprises:
flowing a carrier solution from the carrier container through the capillary;
injecting a sample liquid from the sample container into the capillary to form a sample plug or sample front;
determining a Taylorgram by measuring, with the detector, absorbance over time at the window as the sample plug or sample front flows past the window; and
the processor is configured to:
derive from the Taylorgram a plurality of mutual diffusion coefficient values $D_m$ corresponding with a plurality of different concentrations c of solute in the solvent;
determine a diffusion interaction parameter $k_D$ of the solute in the solvent from the relationship $D_m(c)$ between the mutual diffusion coefficient values $D_m$ and the corresponding concentrations c.

14. An apparatus, comprising an instrument an instrument and a processor, wherein:
the instrument comprises:
a capillary comprising a window,
a carrier container for receiving a carrier liquid,
a sample container for receiving a sample liquid, and
a detector configured to detect absorbance of a liquid within the capillary at the window; and
the instrument is configured to obtain a Taylorgram comprising a plurality of measurements of solute concentration c by performing a Taylor dispersion analysis, wherein performing the Taylor dispersion analysis comprises:
flowing a carrier solution from the carrier container through the capillary;

injecting a sample liquid from the sample container into the capillary to form a sample plug or sample front;

determining a Taylorgram by measuring, with the detector, absorbance over time at the window as the sample plug or sample front flows past the window; and the processor is configured to:

derive from the Taylorgram a plurality of mutual diffusion coefficient values $D_m$ corresponding with a plurality of different concentrations c of solute in the solvent;

estimate a measure of aggregation of solute particles from the values of the mutual diffusion coefficient over the duration of the Taylorgram; and determine a diffusion interaction parameter $k_D$ of the solute in the solvent from the relationship $D_m(c)$ between the mutual diffusion coefficient values $D_m$ and the corresponding concentrations c; and determine a stability of the solute in the solution based on the diffusion interaction parameter.

* * * * *